United States Patent [19]
Ovada et al.

[11] Patent Number: 5,440,564
[45] Date of Patent: Aug. 8, 1995

[54] DATA MULTIPLEXER WITH SIMULTANEOUS MULTIPLE CHANNEL CAPABILITY

[75] Inventors: Esther Ovadia, Barrington, R.I.; Arthur J. Barabell, Natick; Manickam R. Sridhar, Norton, both of Mass.

[73] Assignee: Motorola, Inc., Schaumburg, Ill.

[21] Appl. No.: 15,324

[22] Filed: Feb. 9, 1993

Related U.S. Application Data

[63] Continuation of Ser. No. 531,829, Jun. 1, 1990, abandoned.

[51] Int. Cl.$^6$ .............................................. H04J 1/16
[52] U.S. Cl. .................................... 370/112; 370/16; 340/827
[58] Field of Search ............ 370/60, 94.1, 112, 58.1, 370/79, 118, 80, 84, 16; 340/827; 371/11.1, 8.1, 8.2; 455/8, 59; 375/38

[56] References Cited

U.S. PATENT DOCUMENTS

| | | | |
|---|---|---|---|
| 4,107,469 | 8/1978 | Jenkins | 370/118 |
| 4,528,660 | 7/1985 | Gentry | 370/80 |
| 4,710,920 | 12/1987 | Manning | 370/112 |
| 4,727,541 | 2/1988 | Mori et al. | 370/112 |
| 4,775,987 | 10/1988 | Miller | 370/118 |
| 4,823,342 | 4/1989 | Morita et al. | 370/79 |
| 4,899,337 | 2/1990 | Hirai | 370/80 |
| 4,914,655 | 4/1990 | Johannes et al. | 370/112 |
| 4,933,934 | 6/1990 | Aikoh et al. | 370/112 |
| 4,939,722 | 7/1990 | Beichler | 370/112 |
| 5,239,560 | 8/1993 | Daniel | 375/38 |
| 5,243,629 | 9/1993 | Wei | 375/38 |

Primary Examiner—Douglas W. Olms
Assistant Examiner—Dang Ton
Attorney, Agent, or Firm—Darleen J. Stockley

[57] ABSTRACT

Capability is provided to dynamically reallocate the multiplex data stream from one communication channel to a plurality of communication channels. This allows increased flexibility in responding to degradation of the main communication channel and in accommodating increased user demand exceeding the capacity of the main channel. A table is generated to control the DTE PORTs accessed during each slot of a multiplexer frame. A separate table is generated to control the allocation of multiplex data between communication channels. Both tables are generated based upon a common Hash table. A plurality of Hash tables correspond to different output data rates and permit the output rate of the multiplexer to coincide with the maximum output rate capacity of an associated transmission device such as a modem.

22 Claims, 11 Drawing Sheets

ENTRIES PER FRAME

TABLE A1

BAUD RATE=2400

| DATA RATE(BIPS) | N |
|---|---|
| 1200 | 16 |
| 2400 | 32 |
| 4800 | 64 |
| 7200 | 96 |
| 9600 | 128 |
| 12000 | 160 |
| 14400 | 192 |
| 16800 | 224 |
| 19200 | 256 |
| 21600 | N/A |
| 24000 | N/A |

TABLE A3

BAUD RATE=2954
38400/13

| DATA RATE(BIPS) | N |
|---|---|
| 1200 | 13 |
| 2400 | 26 |
| 4800 | 52 |
| 7200 | 78 |
| 9600 | 104 |
| 12000 | 130 |
| 14400 | 156 |
| 16800 | 182 |
| 19200 | 208 |
| 21600 | 234 |
| 24000 | N/A |

TABLE A2

BAUD RATE=2743
19200/7

| DATA RATE(BIPS) | N |
|---|---|
| 1200 | 14 |
| 2400 | 28 |
| 4800 | 56 |
| 7200 | 84 |
| 9600 | 112 |
| 12000 | 140 |
| 14400 | 168 |
| 16800 | 196 |
| 19200 | 224 |
| 21600 | 252 |
| 24000 | N/A |

TABLE A4

BAUD RATE=3200

| DATA RATE(BIPS) | N |
|---|---|
| 1200 | 12 |
| 2400 | 24 |
| 4800 | 48 |
| 7200 | 72 |
| 9600 | 96 |
| 12000 | 120 |
| 14400 | 144 |
| 16800 | 168 |
| 19200 | 192 |
| 21600 | 216 |
| 24000 | 240 |

FIG.6

HASH TABLE

BAUD RATE=2400
32 POSITIONS ARE OCCUPIED FOR EACH INCREMENT INCREASE OF 2400 BIPS.
16 POSITIONS ARE OCCUPIED FOR EACH INCREMENT INCREASE OF 1200 BIPS.

000,016,032,048,064,080,096,112
128,144,160,176,192,208,224,240
008,024,040,056,072,088,104,120
136,152, 168,184,200,216,232,248

003,019,035,051,067,083,099,115
131,147,163,179, 195,211,227,243
011, 027,043,059,075,091,107,123
139,155,171,187,203,219,235,251

006,022,038,054,070,086,102,118
134,150,166,182,198,214,230,246
014,030,046,062,078,094,110,126
142,158,174,190,206,222,238,254

001,017,033,049,065,081,097,113
129,145,161,177,193,209,225,241
009,025,041,057,073,089,105,121
137,153,169,185,201,217,233,249

004,020,036,052,068,084,100,116
132,148,164,180,196,212,228,244
012,028,044,060,076,092,108,124
140,156,172,188,204,220,236,252

007,023,039,055,071,087,103,119
135,151,167,183,199,215,231,247
015,031,047,063,079,095,111,127
143,159,175,191,207,223,239,255

002,018,034,050,066,082,098,114
130,146,162,178,194,210,226,242
010,026,042,058,074,090,106,122
138,154,170,186,202,218,234,250

005,021,037,053,069,085,101,117
133,149,165,181,197,213,229,245
013,029,045,061,077,093,109,125
141,157,173,189,205,221,237,253

HASH TABLE

BAUD RATE=2743
28 POSITIONS ARE OCCUPIED FOR EACH INCREMENT INCREASE OF 2400 BIPS.
14 POSITIONS ARE OCCUPIED FOR EACH INCREMENT INCREASE OF 1200 BIPS.

NEVER USED POSITIONS:
00,64,128,192

HASH TABLE

BAUD RATE=2954
26 POSITIONS ARE OCCUPIED FOR EACH INCREMENT INCREASE OF 2400 BIPS.
13 POSITIONS ARE OCCUPIED FOR EACH INCREMENT INCREASE OF 1200 BIPS.

NEVER USED POSITIONS:
0,11,22,34,46,57,69,81,92,104,116
127,139,151,162,174,186,197,209,221,232,244

HASH TABLE

BAUD RATE=3200
24 POSITIONS ARE OCCUPIED FOR EACH INCREMENT INCREASE OF 2400 BIPS.
12 POSITIONS ARE OCCUPIED FOR EACH INCREMENT INCREASE OF 1200 BIPS.

NEVER USED POSITIONS:
0,16,32,48,64,80,96,112
128,144,160,176,192,208,224,240

HASH TABLE EXAMPLE

BAUD RATE=2954
26 POSITIONS ARE OCCUPIED FOR EACH INCREMENT INCREASE OF 2400 BIPS.
13 POSITIONS ARE OCCUPIED FOR EACH INCREMENT INCREASE OF 1200 BIPS.

003,023,042,062,082,101,121
141,160,180,200,219,239
013,032,052,072,091,111,131
150,170,190,210,229,249 ⎫ PORT 1 = 1*2400 BIPS = 2400 BIPS 006,026,045,065,085,105,124
144,164,183,203,223,242
016,036,055,075,095,114,134
154,173,193,213,233,252

009,029,049,068,088,108,128
147,167,187,206,226,246
019,039,059,078,098,118,137
157,177,196,216,236,255

002,021,041,061,080,100,120
140,159,179,199,218,238
012,031,051,071,090,110,130
149,169,189,208,228,248

005,025,044,064,084,103,123
143,163,182,202,222,241
015,035,054,074,094,113,133
153,172,192,212,231,251 ⎬ PORT 2 = 7*2400 BIPS = 16800 BIPS 008,028,048,067,087,107,126
146,166,185,205,225,245
018,038,058,077,097,117,136
156,176,195,215,235,254

001,020,040,060,079,099,119
138,158,178,198,217,237
101,030,050,070,089,109,129
148,168,188,207,227,247

004,024,043,063,083,102,122
142,161,181,201,220,240
014,033,053,073,093,112,132
152,171,191,211,250 ⎭

007,027,047,066,086,106,125
145,165,184,204,224,243 ⎫ PORT 3 = .5*2400 BIPS = 1200 BIPS 017,037,056,076,096,115,135
155,175,194,214,234,253 ⎫ PORT 4 = .5*2400 BIPS = 1200

NEVER USED POSITIONS:
0,11,22,34,46,57,69,81,92,104,116
127,139,151,162,174,186,197,209,221,232,244

*FIG.10*

HASH TABLE EXAMPLE

BAUD RATE=2954
26 POSITIONS ARE OCCUPIED FOR EACH INCREMENT INCREASE OF 2400 BIPS.
13 POSITIONS ARE OCCUPIED FOR EACH INCREMENT INCREASE OF 1200 BIPS.

PORT 1
{ 003,023,042,062,082,101,121
141,160,180,200,219,239
013,032,052,072,091,111,131
150,170,190,210,229,249 }

PORT 2
{
006,026,045,065,085,105,124
144,164,183,203,223,242
016,036,055,075,095,114,134
154,173,193,213,233,252

009,029,049,068,088,108,128
147,167,187,206,226,246
019,039,059,078,098,118,137
157,177,196,216,236,255

002,021,041,061,080,100,120
140,159,179,199,218,238
012,031,051,071,090,110,130
149,169,189,208,228,248
}  DIAL RATE = 4*2400 BIPS = 9600 BIPS

{
005,025,044,064,084,103,123
143,163,182,202,222,241
015,035,054,074,094,113,133
153,172,192,212,231,251

008,028,048,067,087,107,126
146,166,185,205,225,245
018,038,058,077,097,117,136
156,176,195,215,235,254

001,020,040,060,079,099,119
138,158,178,198,217,237
101,030,050,070,089,109,129
148,168,188,207,227,247

004,024,043,063,083,102,122
142,161,181,201,220,240
014,033,053,073,093,112,132
152,171,191,211,250
} LEASE RATE = 5*2400 = 12000 BIPS

PORT 3 { 007,027,047,066,086,106,125
145,165,184,204,224,243 }

PORT 4 { 017,037,056,076,096,115,135
155,175,194,214,234,253 }

*FIG.11*

NEVER USED POSITIONS:
0,11,22,34,46,57,69,81,92,104,116
127,139,151,162,174,186,197,209,221,232,244 } NULL

DATA MULTIPLEXER WITH SIMULTANEOUS MULTIPLE CHANNEL CAPABILITY

This is a continuation of application Ser. No. 07/531,829, filed Jun. 1, 1990 and now abandoned.

FIELD OF THE INVENTION

This invention relates to data multiplexers and more specifically relates to a multiplexer capable of dynamically reallocating part of a multiplexed data stream from a main channel to an auxiliary channel to handle the total data throughput demand. This invention is further directed to a data multiplexer capable of dynamically changing its data rate based on the quality of the communication channel.

BACKGROUND OF THE INVENTION

A conventional multiplexer receives data from a plurality of data sources or data terminal equipment (DTE) and combines the data for transmission over a single high speed communication channel. In order to accommodate the data throughput demand, the communication channel capacity must at least equal the aggregate data rate from the data sources.

Bit multiplexers operate on received data on a bit by bit basis. These multiplexers require that the ratio of the aggregate data rate to the signalling (baud) rate be an integer. Also, the ratio of the bit rate of each DTE to the baud rate must be an integer. It will be apparent that these conditions place restrictions on the bit rates and baud rates which can be used.

Statistical multiplexers require that the aggregate transmission rate be equal to the sum of a subset of DTE port rates. For example, if DTE rates were 14.4, 2.4 and 2.4 Kbps, the statistical multiplexer would require the communication channel to be able to support at least 14.4 Kbps. Thus, the highest DTE rate could not be accommodated by splitting the throughput demand over two or more communication channels.

Multiplexing systems have used a feature known as restoral. Systems with this feature provide a means for switching to an alternate transmission channel upon the failure of the main communication channel or degradation below the maximum throughput rate required. If conditions dictate switching to an alternate channel, the restoral feature switches the entire data stream to an alternate channel thereby abandoning all communications over the main channel.

Biplexers generate transmission data streams with equal data rates. Thus, they cannot take full advantage of transmission channels with different throughput capabilities. Normally biplexers split a user data stream into multiple data streams which are transmitted over separate transmission devices. Any change in the data rate or failure of a channel will result in a drop in the available user data rate.

OBJECT OF THE INVENTION

It is an object of the present invention to provide an improved data multiplexer capable of diverting part of the data being transmitted over a primary communication channel to a second communication channel either in response to increased user data demand or upon the main communication channel degrading below the required data throughput rate.

It is a further object of the present invention to provide an improved data multiplexer capable of selecting from among a plurality of baud communication rates dependent upon the quality of the communication channel.

These objects and other benefits of the present invention can be ascertained by reference to the following description of an embodiment of the invention.

BRIEF DESCRIPTION OF THE DRAWINGS

Hash FIGS. 6, 7, 8, and 9 each correspond to a different multiplexer data (baud) rate and define an access sequence of 256. The four Tables shown in FIG. 2 are derived based on the Hash Tables shown in these figures.

Hash FIG. 10 Example illustrates an example of a multiplexer in accordance with the present invention accommodating four DTE ports. Tables 42 and 56 of FIG. 2 are defined for this example by the Hash Table.

Hash FIG. 11 Example illustrates the use of a Hash Table to define Tables 44 and 58 of FIG. 2. The Hash Tables define 256 accesses per multiplexer.

DETAILED DESCRIPTION

Figure 1:
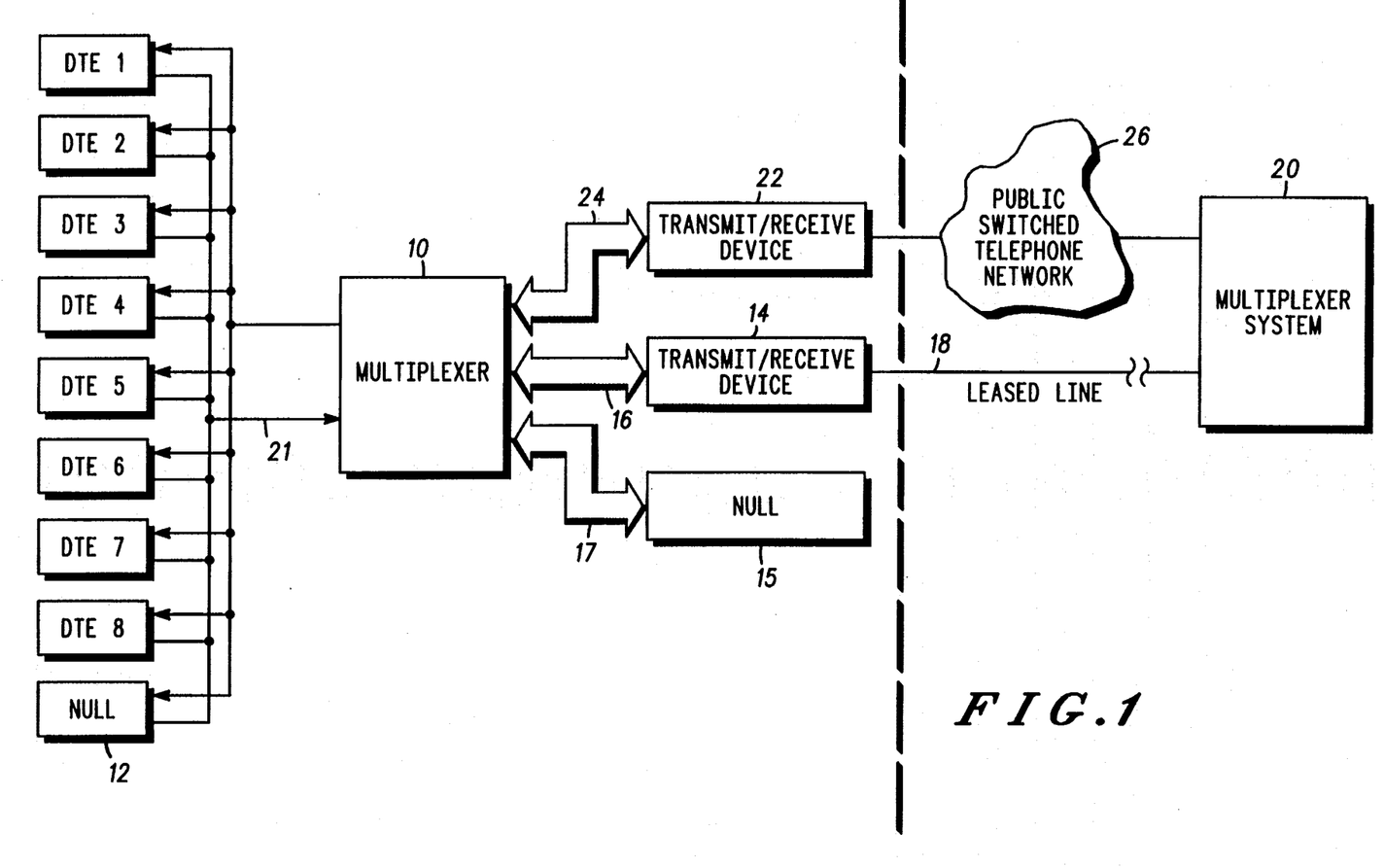
FIG. 1 is a block diagram illustrating an embodiment of a data multiplexer in accordance with the present invention incorporated in a data communications system.

FIG. 1 illustrates a digital communication system in which multiplexer 10 receives and transmits data to a plurality of digital terminal equipment (DTE 1-DTE 8). A "null" DTE 12 represents an address location for multiplexer 10 from which user data will never be present. This null DTE can be selected by multiplexer 10 during slots in the multiplexer frame when user data is not being accessed.

A transmit/receiver (TX/RX) device 14 is coupled by means of a channel 16 to multiplexer 10. In the illustrative example, device 14 comprises a modem which is connected to a leased telephone line 18 to a remote multiplexer system 20.

Multiplexer 10 receives data from DTE 1-DTE 8 which may each be operating at various data rates. The aggregate data rate received by multiplexer 10 on line 22 equals the sum of the DTE data rates. In the "normal" mode of operation, multiplexer 10 multiplexes or combines the received data and provides a single output data stream coupled to modem 14 by channel 16. The modem combines digital data bits into groups of bits which are transmitted as a QAM signal over leased line 18 to a complementary receiving modem which comprises part of multiplexer system 20. This remote modem would also be coupled to a substantially identical multiplexer which would demultiplex or segregate the data back into corresponding output ports to complementary DTEs in system 20.

One of the important aspects of the present invention resides in multiplexer 10 being able to selectively route part of the incoming received data from the DTE's over a second or alternate communication path. A TX/RX device 22 which may also comprise a modem is connected to multiplexer 10 by channel 24. Modem 22 is connected to a complementary modem in multiplexer system 20 by the public switched telephone network (PSTN) 26. In general, multiplexer system 20 may consist of an identical system such as shown to the left of the dashed line of FIG. 1.

In the normal mode of operation, multiplexer 10 transmits the input data as a single output data stream by channel 16 to modem 14 and over leased line 18 to multiplexer system 20. This assumes of course that the throughput data capability of leased line 18 is at least equal to the aggregate data rate of DTE 1–DTE 8. Of course, modem 14 must also be capable of at least the aggregate data rate.

Circumstances may develop by which the aggregate input data rate exceeds the capacity of leased line 18. For example, the initial system may comprise only DTE 1–DTE 4 being used and providing an aggregate data rate approximately equal to the maximum data rate which can be supported by leased line 18. Assume that the user wishes to add another DTE 5 (or more) thereby exceeding the leased line capacity. In a conventional multiplexer, the user would have to substitute DTE 5 for one of the other DTEs of equal or greater data rate. The multiplexer 10 according to the present invention can accommodate the increased data demand by creating a second multiplexer data stream over channel 24 to prevent the increased user demand from exceeding the throughput data capacity of the system.

An increased user demand beyond the capability of leased line 18 may occur for a relatively short time. As shown, such additional data is handled by a temporary connection between modem 22 and its corresponding modem in system 20 via PSTN 26. This provides an economical solution where the increased user demand is intermittent and such increased demand period lasts for a relatively short time. A constant increased user demand may justify the use of an additional leased line instead of PSTN 26.

Another example where multiplexer 10 can be used to advantage occurs when leased line 18 is operating at near capacity relative to user demand and the quality of the leased line degrades such as due to weather conditions. For example, if leased line 18 is specified for a maximum data rate of 19.2 Kbps, the line may degrade to support only 9.6 Kbps or 14.4 Kbps due to an impaired line condition. Under such conditions, a conventional multiplexer would require the user to reduce the required data demand to accommodate the reduced leased line throughput by denying access to one or more of the DTEs. Alternatively, a conventional multiplexer with a restoral feature might divert the entire multiplex data stream to an alternate channel.

The multiplexer according to the present invention provides an improved solution in the case of an impairment of leased line 18. The impairment can be sensed by device 14 and a signal conveyed by channel 16 to multiplexer 10 indicative of the impairment. The modem may sense the impairment either by an increased bit error rate or by a test which measures the quality of the leased line. Multiplexer 10 responds to the indicated impairment by reinitializing itself and its complementary multiplexer in system 20 so that the data rate over leased line 18 is reduced to the level of the degraded line capacity. An additional data stream over the PSTN is established to carry the remaining data. A patent application entitled "Automatic Data Restoral for Modems", Ser. No. 460,780, and assigned to the assignee of the present invention, is incorporated herein by reference.

Figure 2:
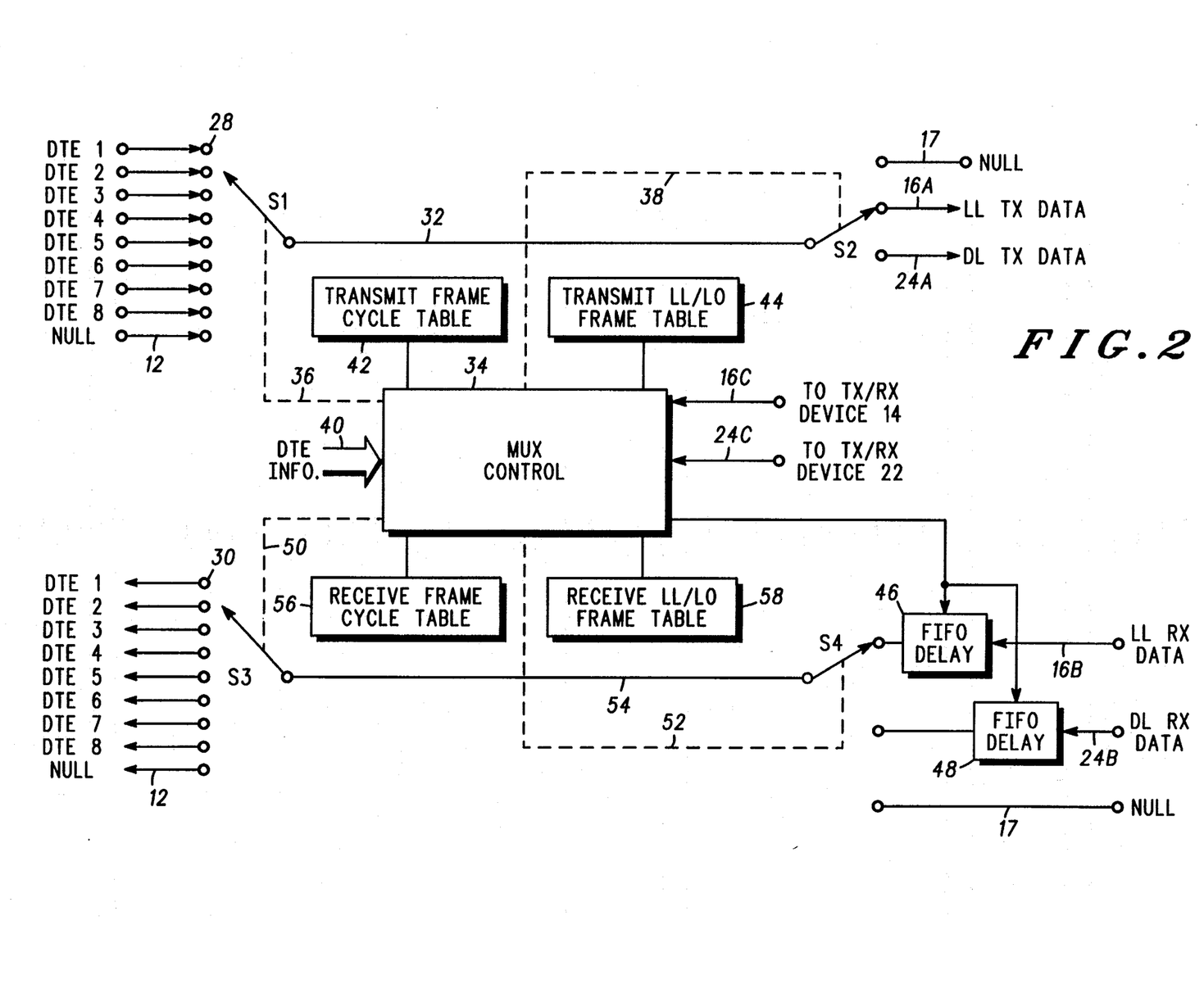
FIG. 2 is a diagram of the multiplexer as shown in FIG. 1.

FIG. 2 illustrates a multiplexer 10 in accordance with the present invention. Switch S1 selects connections to data being transmitted from DTE 1–DTE 8 and null 12 by terminals 28. Switch S3 selects connections to terminals 30 by which data is transmitted from multiplexer 10 to DTE 1–DTE 8 and null location 12. Data from the DTE's coupled from switch S1 is transmitted by path 32 to switch S2 which transmits the data to either device 14 by path 16A or device 22 by path 24A or to null device 15 by path 17. As used herein, LL and DL are abbreviations for leased line and dial line, respectively. The switches S1 and S2 are controlled by the multiplexer (MUX) control 34 as indicated by control lines 36 and 38, respectively.

The schematic representation of multiplexer 10 as shown in FIG. 2 has been simplified in order to facilitate an understanding of the improvements according to the present invention. Accordingly, it will be understood that MUX control 34 would typically consist of a microprocessor system. Although data selection from among the DTE's is shown by means of a mechanical switch, it will be understood that this function is normally implemented in electronic gates and registers or memory which receive data from the DTEs. Since conventional multiplexers are known which use a microprocessor system, only those features which relate to the improvements of the present invention are described in detail.

DTE information is provided to MUX control 34 by inputs 40. This information includes the number of DTEs to be supported, the respective data rate of each, and the aggregate data rate for all DTEs. This information may be provided by means of manual switches located on the panel of the multiplexer or may be transmitted to the multiplexer. Paths 16C and 24C provide communication paths between MUX control 34 and devices 14 and 22. Each device provides the MUX control 34 with information required such as the maximum data rate the respective channels are capable of running and the baud rate utilized by each modem. These lines also couple signals indicative of reduced line throughput capacity resulting from line degradation from the respective modems to MUX control 34.

The transmit frame cycle table 42 and transmit LL/DL frame table 44 preferably comprise lookup tables generated and utilized by the microprocessor system of MUX control 34. The transmit frame cycle table defines a transmit frame and the number of times each of the DTE input terminals 28 will be read by means of switch S1 and the time slots in which such connections are made. The TX LL/DL frame table determines for each frame slot whether switch S2 will couple the DTE to modem 14 or 22 or to null device 15.

The above descriptions with regard to FIG. 2 describe the multiplexer 10 transmission function; the multiplexer receiver function is very similar and could be said to be the mirror image of the transmit function. The received data stream or streams by modem 14 and 22 are converted to digital data and transmitted by channels 16B and 24B to first in-first out delay elements 46 and 48, respectively. These represent controllable delay elements having a delay controlled by multiplexer control 34. Where data is transmitted over the two separate channels, it will be apparent that different delays will likely be encountered. Thus, in order to equalize the arrival of the received data, different delays can be utilized. During the training of the modems 14 and 22 with their respective counterparts, the delay associated with each path can be measured and provided by lines 16C and 24C to MUX control 34. The channel with the shortest delay, typically the leased line, would have its FIFO delay set to the differential delay time between the leased line and the PSTN channel. The FIFO of the PSTN channel having the longer delay is set to zero. These delay times in combination with conventional received data buffering associated with conventional multiplexers should be sufficient to ensure that data underflow or overflow of the buffers do not occur due to different channel delays. This also preserves list time synchronization.

Switches S3 and S4 are controlled by MUX control 34 as represented by control lines 50 and 52, respectively. Switch S3 and switch S4 are complementary to switches S1 and S2, respectively. That is, to be properly synchronized, switch S3 will be connected to the same DTE as switch S1 when the corresponding data was transmitted. Similarly, switch S4 will be coupled to receive the data from modem 14 or 22 dependent on the original transmission as determined by switch S2. Switch S4 couples the received data by path 54 to switch S3.

Receive frame cycle table 56 and Receive LL/DL frame table 58 will be identical to the corresponding tables 42 and 44 in the transmitting multiplexer 10 from which the data is received. Table 56 represents a table which is utilized to control the distribution of data for each frame slot to the DTEs by switch S3. Table 58 consists of a table which controls from which channel the data will be received for each frame slot by control of switch S4. It will be understood by those skilled in the art that the normal receive function of a multiplexer must be complementary to the transmit function of the multiplexer in order to properly recover and distribute original data.

Figure 3:
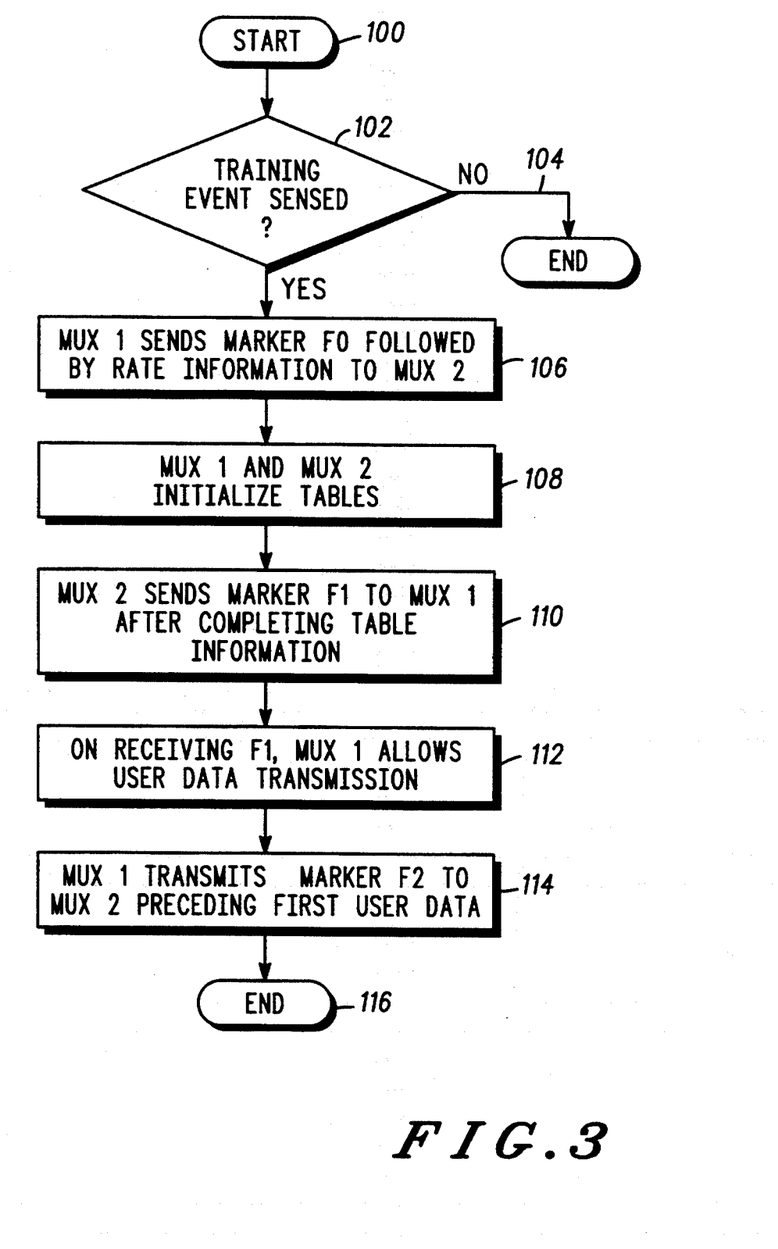
FIG. 3 is a flow diagram illustrating the multiplexer training sequence.

FIG. 3 is a flow diagram illustrating the multiplexer training routine. Entry into the routine begins at START 100 and is followed by a training event sense decision 102. Training events include initial power-up, a change of modem configuration such as change of baud rate, leased line degradation requiring reconfiguration of data paths, and a received request to retrain from a remote multiplexer. If such an event is not sensed, this routine ends by branch 104. Upon sensing such an event, the initiating multiplexer (MUX 1) sends a marker F0 followed by rate information to the receiving multiplexer (MUX 2) as indicated by function 106. Then by function 108, MUX 1 and MUX 2 initialize tables 42, 44, 56 and 58. Next, MUX 2 sends a marker F1 to MUX 1 after completing table initialization as indicated by function 110. On receiving marker F1, MUX 1 allows user data to be transmitted as indicated by function 112. Finally, MUX 1 transmits a marker F2 to MUX 2 preceding the first user data according to function 114. The routine then terminates at END 116. Thus, the transmitting and receiving multiplexers are initialized in accordance with the above procedure prior to the transmission or reception of user data.

The multiplexer of the present invention uses fixed cyclic frames having a predetermined number of slots, such as 256. In the illustrated embodiment, the multiplexer is capable of obtaining data from up to eight DTE ports during a frame. Switches S1 and S3 are designed to accept or deliver a fixed number, such as 4, bits per access of each port regardless of the data rate of the port. The multiplexer determines how many times per frame each port must be accessed in order to accommodate the port rate. The multiplexer can read or write to each port at a maximum of twice per baud and must process two entries of the frame per baud. The following formula illustrates the number of accesses for a particular port required during a frame to achieve a desired rate:

$$N = \text{data rate} \times 256 / [\text{baud rate} * 8]$$

where N is the number of accesses to a particular port required during a frame, data rate corresponds to the data rate in bits per second of the particular port, and baud rate is the baud rate of the corresponding modem.

Figure 5:
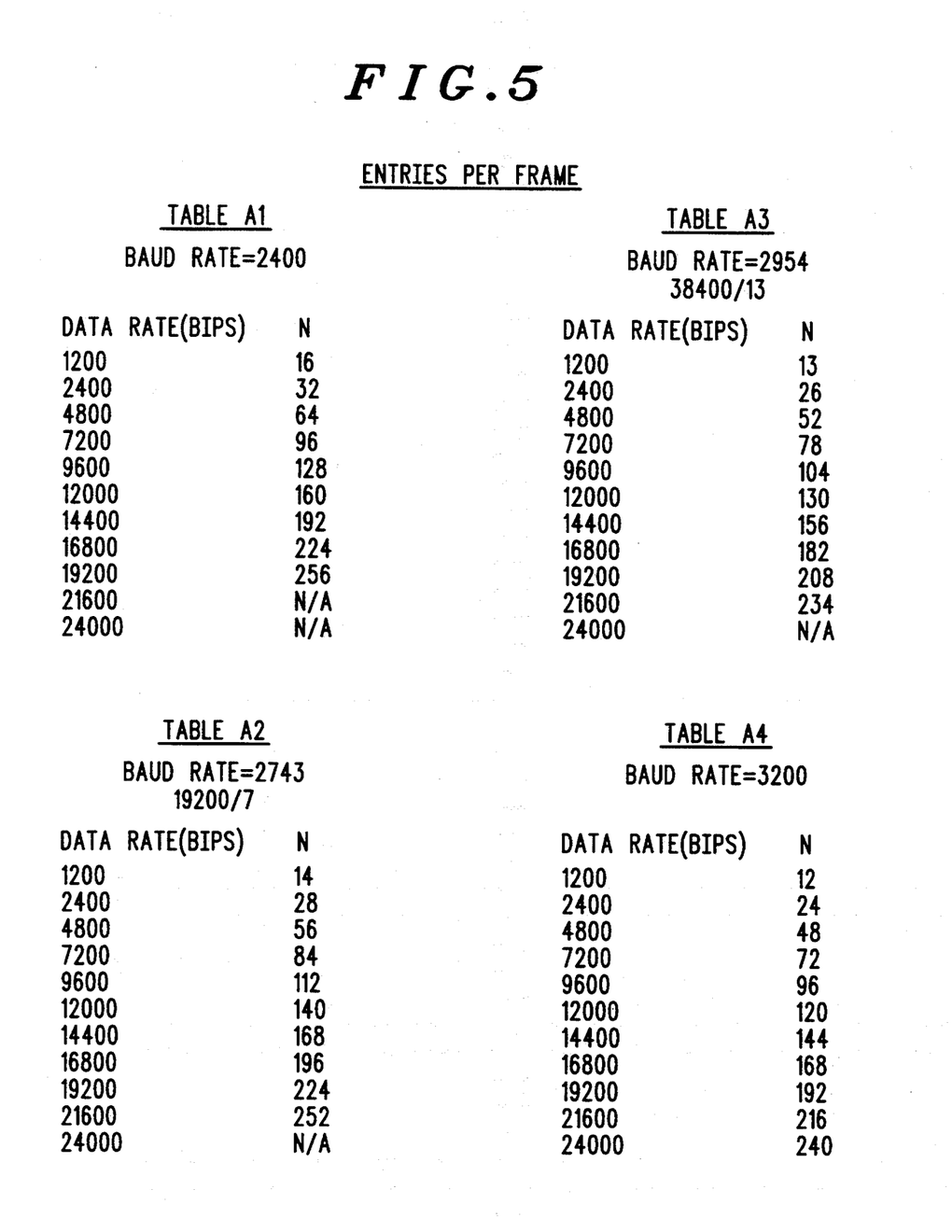
FIG. 5 consists of Tables A1-A4 each illustrating the number (N) of read/write accesses for DTE port rates for four multiplexer data (baud) rates.

FIG. 5 illustrates the number of entries or slots per frame for the four different baud rates indicated in tables A1–A4. The "n/a" indicates that such data rates are not available since the number of accesses required to accommodate such a rate would exceed 256. Thus, it will be apparent that for higher baud rates higher data rates can be accommodated. It should be noted that the baud rates indicated for table A2 and A3 consist of rounded numbers with the actual baud rate indicated by the associated fraction.

Figure 6:
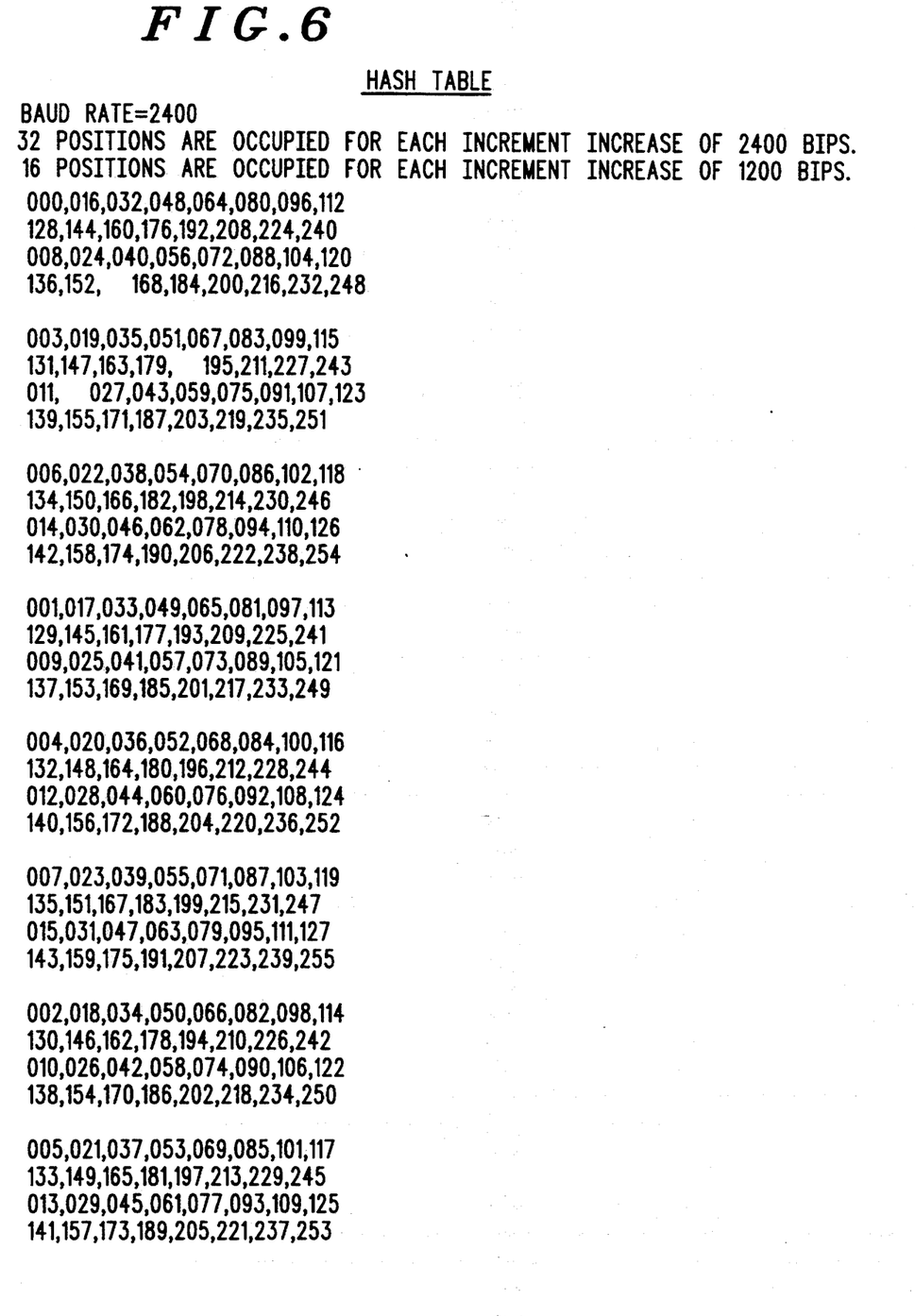
Figure 7:
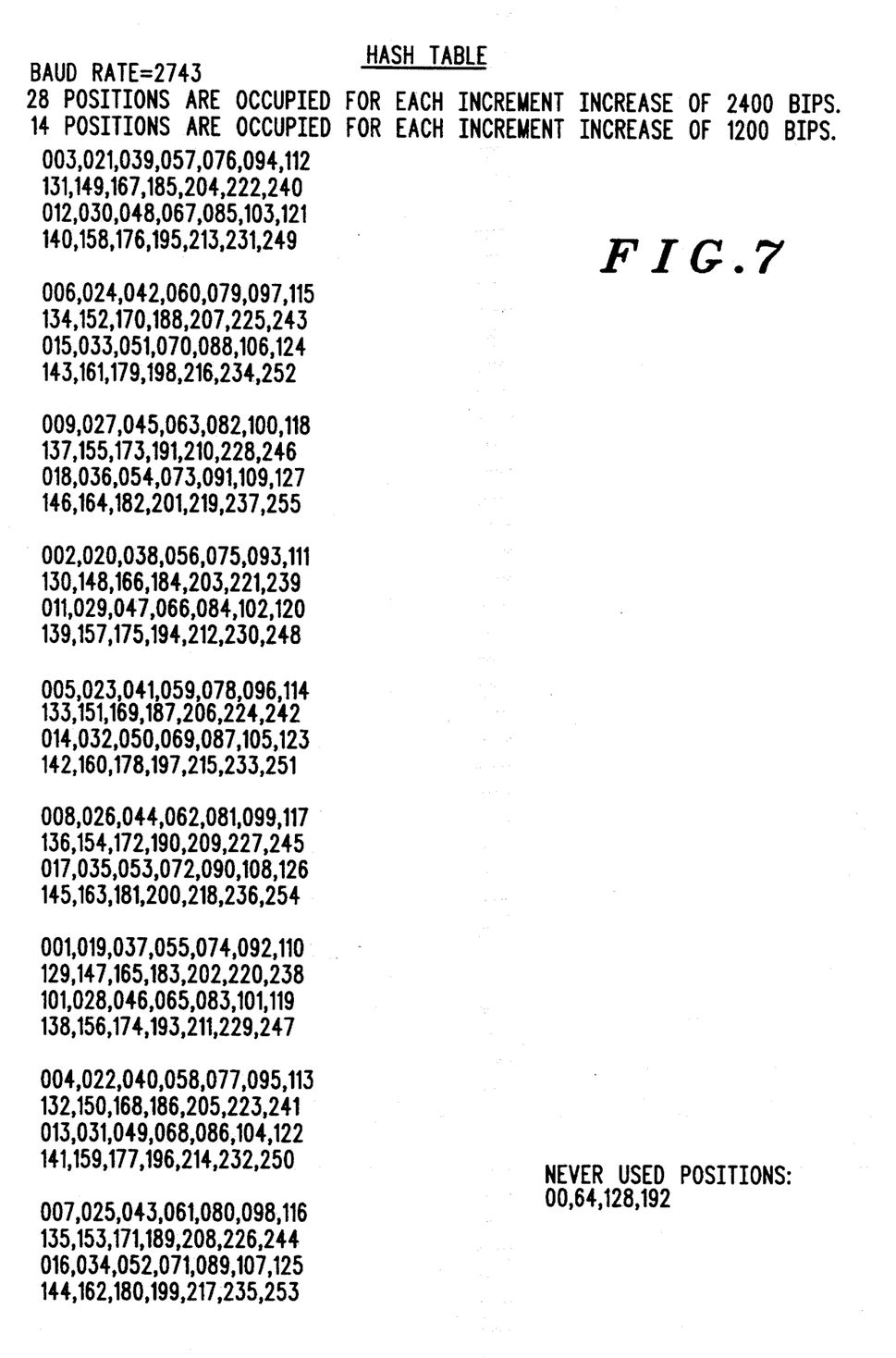
Figure 8:
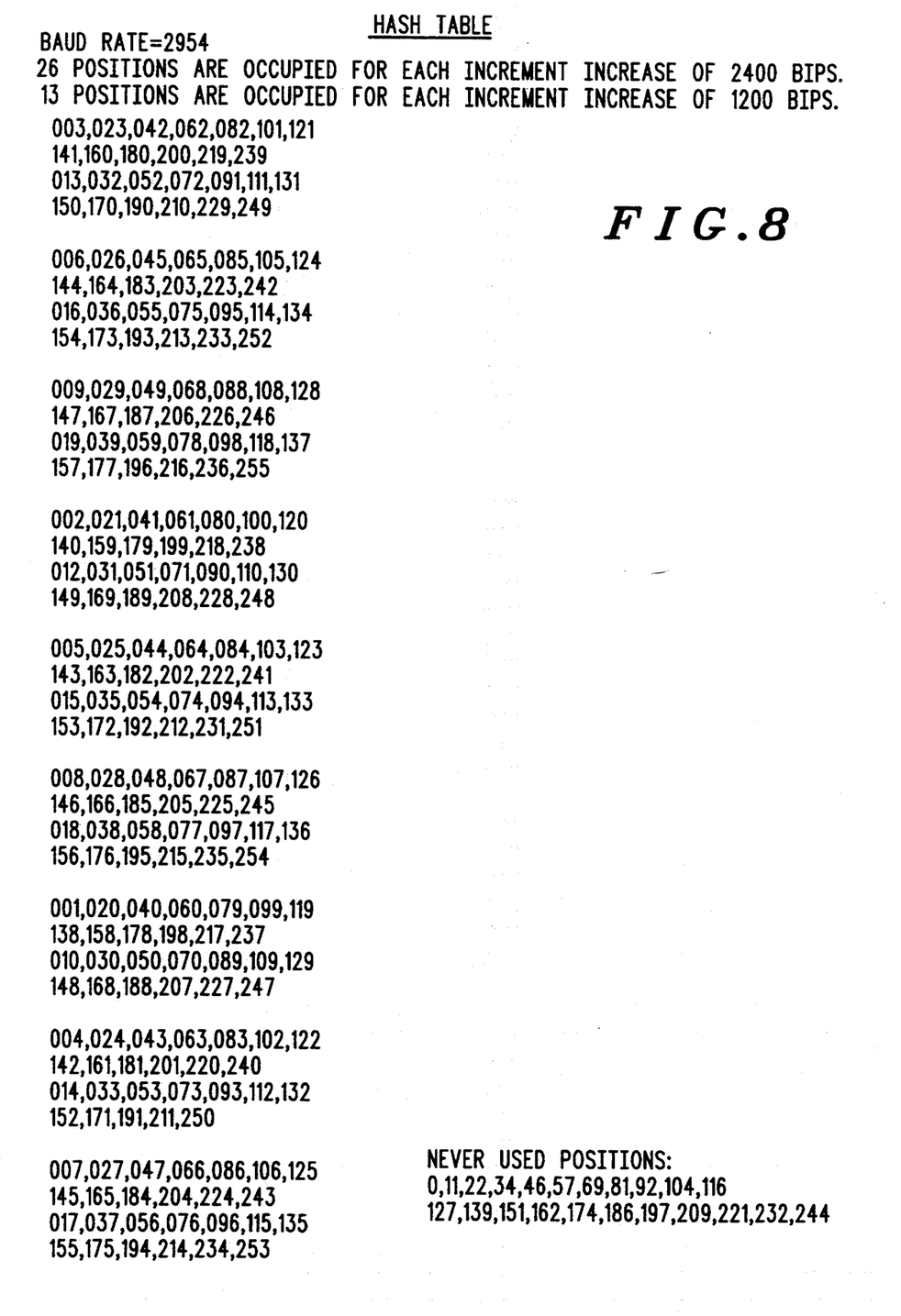
Figure 9:
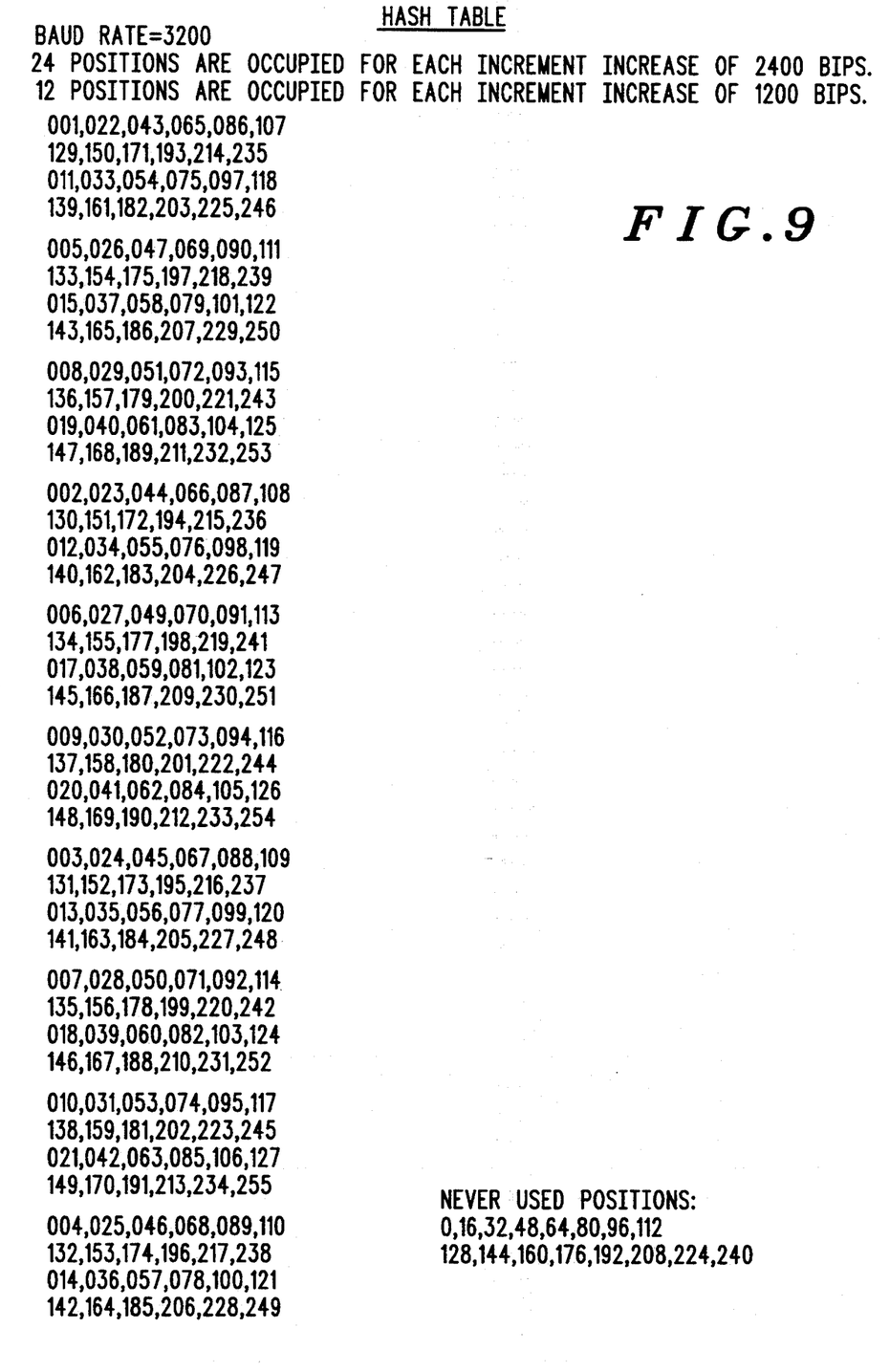

Hash FIGS. 6, 7, and 9 are provided for each of the four baud rates. Each Hash table of FIGS. 6–9 represents a predetermined sequencing for each entry from 0 to 255 for each multiplexer frame. It will be noted that each Hash table is divided into four line groupings, each of which represent 2.4 Kbps. Thus, a data rate of 1.2 Kbps can be achieved by utilizing two lines of each four line grouping with the other two lines allocated to another 1.2 Kbps port. For all of the Hash tables except FIG. 6, it will be seen that certain positions are not used, i.e. these positions represent null reads or writes.

Figure 10:
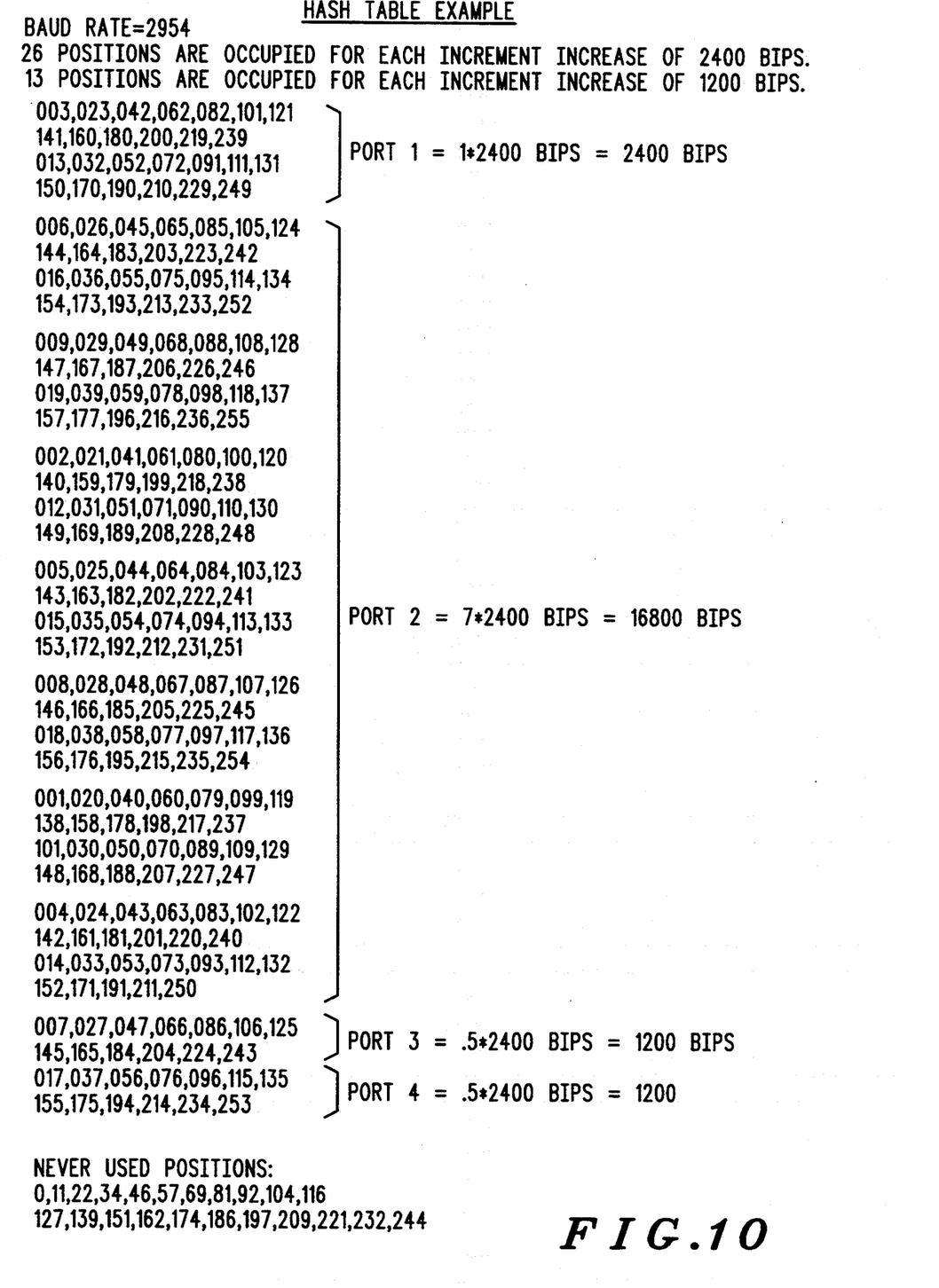

Hash FIG. 10 illustrates an example of the use of Hash FIG. 8 for a user configuration as follows: PORT 1=2.4 Kbps; PORT 2=16.8 Kbps; PORT 3=1.2 Kbps; PORT 4=1.2 Kbps; PORTS 5–8=not used. For the selected baud rate of 2954, this example illustrates that the full user data throughput capacity of 21.6 Kbps has been utilized. The particular access slots in each frame are indicated for each of the four PORTS as shown in FIG. 10. This table determines the control of switch S1 and the corresponding switch S3 in the receiving multiplexer. As a counter counts incrementally from 0 through 255, it will be apparent that different PORTS are accessed according to each slot definition. For example, PORT 1 would be accessed on the third count and accessed for the last time during the frame at count 249. TX frame cycle table 42 (and the corresponding RX frame cycle table 56 in the receiving multiplexer) would each consist of a series of 256 entries with each entry having a corresponding address which identifies the PORT to be addressed during that interval. This table is generated based upon a selected Hash table dependent upon the baud rate of the associated modem and on user data requirements defined for each DTE PORT.

Figure 4:
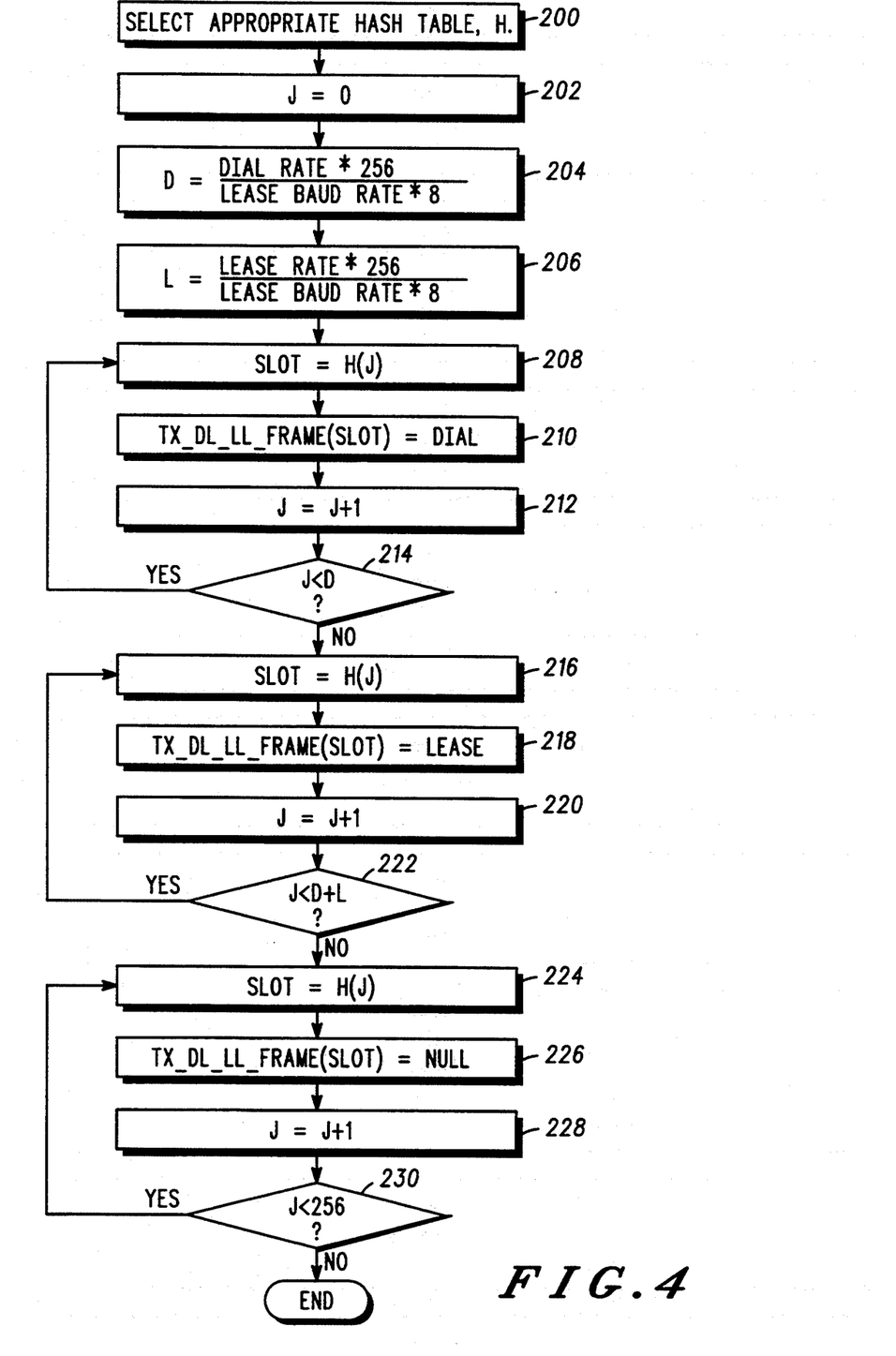
FIG. 4 is a flow diagram illustrating the generation of a transmit (receive) leased line/dial line frame table utilized by the embodiment of the present invention.

FIG. 4 shows a flow diagram which describes how tables 44 and 58 are generated from a selected Hash table. This sequence begins at step 200 in which the appropriate Hash table is selected based upon the baud rate of the associated modem. Parameters J, D, and L are defined by steps 202, 204, and 206, respectively. Parameters D and L define the number of frame slots in which data is to be transmitted (received) by the dial line channel and leased line channel. The Hash table selected by step 200 will be the same Hash table as selected for the generation of tables 42 and 56, i.e. corresponding to the leased line baud rate.

Following the setting of these parameters, the function H(J) is defined as SLOT in step 208 and corresponds to index position J in the Hash table. In step 210, the TX DL/LL frame (SLOT) is defined equal to DIAL. Thus each function H(J) referenced in the Hash table is defined as a slot position where data is to be sent to the dial line by control of S2. The J parameter is incremented in step 212 and step 214 makes a decision as indicated. The YES path creates a return to step 208 setting up a repetitive loop until J equals or exceeds D. This condition will be satisfied, i.e. the NO path will be selected, when the number of slots defined by the Hash table have been selected to satisfy the number of bits per second required by the dial rate.

Step 216, 218, 220, and 222 set up a loop which functions similarly to the preceding loop except that the TX DL/LL frame (SLOT) is defined as equal to LEASE. Thus, this loop defines a further series of slots according to the selected Hash table sufficient to satisfy the bits per second required according to the lease line data rate. These slots are selected consecutively according to the Hash table immediately following the selection of the dial rate slots. Step 222 will be satisfied when consecutive slots within the Hash table have been assigned to satisfy both the dial rate and leased rate, as evidenced by exiting via the NO path.

Steps 224, 226, 228, and 230 form the final loop in which any remaining slots in the Hash table not previously assigned as DIAL or LEASE according to the two preceding loops will be assigned equal to NULL. This function corresponds to time slots of no user data transmission. Thus, this loop effectively assigns any remaining slots either available for user data or assigned as never-used slot positions according to the Hash table as a NULL. This loop ends when step 230 determines that all remaining slots through 255 have been assigned. This loop exits by the NO path.

Figure 11:
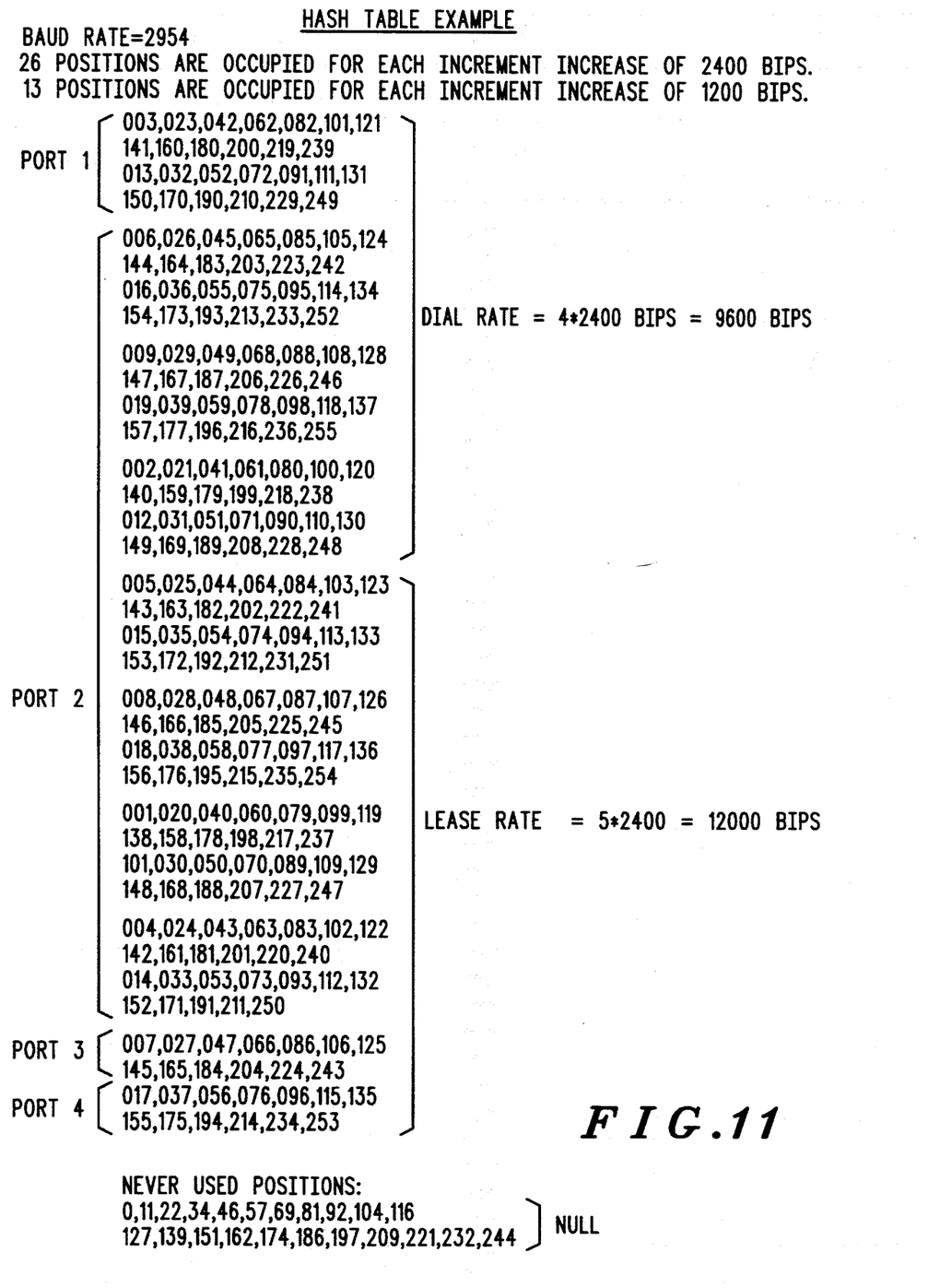

The following example illustrates the generation of the TX (RX) LL/DL frame. Assume that the transmission baud rate is 2954 for a leased line; and an aggregate analog data rate of 21.6 Kbps is distributed as a dial rate of 9.6 Kbps and lease rate of 12 Kbps. FIG. 11 illustrates this example of the generation of the TX (RX) LL/DL table 44 (58) in accordance with FIG. 4 and the Hash table. According to this example, D equals 104 and L equals 130 indicating that the dial rate will require 104 slots and the leased line rate will require 130 slots. As the selection proceeds according to the flow diagram in FIG. 4, the first loop ending at step 214 will assign the first 104 slots in the Hash table as DIAL. The second loop ending at 222 will assign the next 130 slots in the Hash table as LEASE. The final loop ending at step 230 will assign the remainder of the 22 slots in the Hash table as NULL. Thus, all 256 frame slots have been assigned. It will be apparent that all slots within the frame available for user data has been utilized.

A further example with regard to FIG. 11 will illustrate the corresponding assignment of PORT data by use of the same Hash table. For this example consider that the same requirements for the TX LL/DL table as previously explained apply. Further, user defined requirements are as follows:
PORT 1=2.4 Kbps; PORT 2=16.8 Kbps; PORT 3=1.2 Kbps; PORT 4=1.2 Kbps; PORT 5-8=no use. Accordingly, the TX frame cycle table 42 will be generated by a routine similar to that explained with regard to FIG. 4 in which PORT 1 is assigned the first 26 entries corresponding to 2.4 Kbps, PORT 2 is assigned the next 182 (7×2.4 Kbps), PORT 3 the next 13 slots and PORT 4 the final 13 slots to occupy all 234 available user slots. For this example, it will be apparent that all of the data for PORT 1 will be sent over the DIAL line, the data for PORT 2 will be split and transmitted over both the DIAL and LEASED lines, and the data from PORTS 3 and 4 will be transmitted over the LEASED line.

From the above description, it should be noted that the multiplexer according to the present invention has a predetermined number of throughput data rates which correspond to different baud rates of transmission by the modems. Although four such predetermined rates are defined by means of Hash tables, it will be understood that different numbers of data rates can be accommodated by providing appropriate corresponding Hash tables. Economies in terms of memory saving are realized by using the same Hash table to generate both the TX (RX) frame cycle tables which control the order of DTE access per frame slot and the TX (RX) LL/DL frame tables which control the transmission channel utilized per frame slot. Although two communication channels were shown in the exemplary embodiment of the present invention, it will be apparent that more than two such channels could be utilized by applying the concepts of the present invention wherein switches S2 and S4 would distribute the data per slot in each frame appropriately among the data channels.

The present invention provides greater flexibility than in conventional multiplexers and allows the ratio of the data rate for each PORT to the channel signalling (baud) rate only to be a rational number. It may consist of an integer but it must only be a rational number. Multiple signalling data rates are supported. Also the channel signalling rates may be asymmetric thereby allowing the signalling rate best suited for a particular channel to be utilized; different communication channels do not have to operate at the same data rate.

Although the described examples assume input data from multiple DTE's, the multiplexer can be utilized to accept a single high speed data input with the capability of sending the corresponding data over two or more channels. Also data transmission devices such as DSUs could be used instead of modems.

The present invention provides the improved capability of maintaining the aggregate PORT rates corresponding to the user demand under a degrading primary communication channel condition by dynamically reinitializing and adding data transmission capacity over additional communication channels. This capacity to dynamically add additional data transmission capacity also can be utilized to accommodate an increased user data capacity demand, i.e. additional DTE requirements, by routing additional data onto auxiliary transmission channels.

Although an embodiment of the present invention has been described and illustrated in the drawings, the scope of the present invention is defined by the following claims.

What is claimed is:
1. A baud clock driven data multiplexer comprising:

means for receiving data from at least a first data terminal equipment (DTE) port;

means for data multiplexing said received data to form a first data stream wherein said first data stream is a sum of data streams of at least the first DTE port and is carried by a first communication channel to a data demultiplexer that demultiplexes said first data stream back to its original constituent data;

quality-responsive diverting means, responsive to a signal that indicates that a quality of the first communication channel that carries the sum of the data streams of at least the first DTE port has become reduced such that said channel carries less data than said sum of data streams, for automatically diverting part, but not all, of the received data to a second data stream carried by a second channel so that said first and second data streams together support transmission of said received data over said first and second communication channels, where said diverting means establishes communications over said second communication channel only upon said quality of the first communication channel becoming reduced such that said first communication channel is unable to carry all of said first data stream.

2. The multiplexer according to claim 1 wherein said receiving means receives data from a plurality of data terminal equipment (DTE).

3. The multiplexer according to claim 1 wherein only one DTE is actively sending data to the receiving means.

4. The multiplexer according to claim 3 wherein said single DTE provides data at a data rate substantially at the maximum throughput rate of said first channel.

5. The multiplexer according to claim 1 further comprising means for selecting the data rate of said first data stream from among a plurality of predetermined data rates based upon the data capacity of said first communication channel.

6. A baud clock driven data multiplexer comprising:
means for receiving data at a first aggregate data rate from at least a first data terminal (DTE) port;

means for data multiplexing said received data to form a first data stream wherein said first data stream is a sum of data streams of at least the first DTE port and is carried by a first communication channel having a fixed maximum data carrying capacity;

quality-responsive diverting means for automatically diverting part but not all of said received data to a second data stream carried by a second communication channel upon receiving a signal that indicates a quality of said first communication channel that carries the sum of the data streams of at least the first DTE port has become reduced such that the channel is unable to carry the received data at its aggregate data rate such that said channel carries less data than said sum of data streams, and means for causing the diverting means to cease diverting part of said data to said second data stream upon said first communication channel's regaining quality such that said channel is able to carry all of said received data whereby all of said received data is multiplexed into said first data stream, wherein said diverting means establishes communications over said second communication channel only upon said first communication channel being reduced in quality such that said first communication channel is unable to carry all of said first data stream.

7. The multiplexer according to claim 6 wherein said receiving means receives data from a plurality of DTE.

8. The multiplexer according to claim 7 wherein said increase in received data results from an increase in the number of DTE providing said data.

9. The multiplexer according to claim 1 further comprising means for causing said diverting means to cease diverting part of said data to said second data stream upon said first channel becoming able to carry all of said received data whereby all of said received data is multiplexed into said first data stream.

10. The multiplexer according to claim 6 further comprising means for selecting the data rate of said first data stream from among a plurality of predetermined data rates based upon said fixed maximum data carrying capacity of said first communication channel.

11. The multiplexer according to claim 9 wherein said causing means releases use of said second communication channel upon all received data being carried by said first communication channel.

12. The multiplexer according to claim 6 wherein said causing means releases use of said second communication channel upon all received data being carried by said first communication channel.

13. A baud clock driven method of multiplexing digital data comprising the steps of:
receiving digital data from a plurality of DTE's;
data multiplexing said digital data to form a first data stream, wherein said data stream is a sum of data streams from the DTES, and is carried by a first communication channel;
automatically diverting part, but not all, of said received data to form a second data stream carried by a second channel upon said first channel becoming reduced in quality such that said first communication channel is unable to carry all of said first data stream that includes the sum of data streams from the DTES, said first and second data streams together supporting transmission of all of said received data over said first and second communication channels, respectively, and
ceasing the diversion of said part of said digital data to a second data stream upon said first channel's regaining quality such that the first channel is able to carry all of said received data whereby all of said received data is multiplexed into said first data stream,
wherein said diverting step includes establishing communications over said second communication channel only upon said first communication channel becoming reduced in quality such that said first communication channel is unable to carry all of said first data stream.

14. The multiplexer according to claim 13 wherein said ceasing step includes releasing the use of said second communication channel upon all of said received data being carried by said first communication channel.

15. A baud clock driven method for multiplexing digital data comprising the steps of:
(A) receiving said digital data at a first aggregate data rate from at least a first data terminal equipment (DTE) port;
(B) data multiplexing said received data to form a first data stream wherein said first data stream is a sum of data streams of at least the first DTE port and is carried by a first communication channel having a fixed maximum data carrying capacity;

(C) automatically diverting part, but not all, of said received data to a second data stream carried by a second communication channel upon receiving a signal that indicates that a quality of said first channel has become reduced such that said channel is carrying less data than said sum of data streams, and (D) ceasing the diverting of said part of said digital data to a second data stream upon regaining the quality of the first channel, wherein said diverting step includes establishing communications over said second communication channel only upon said first communication channel becoming reduced in quality such that said first communication channel is unable to carry all of said first data stream.

16. The method according to claim 15 further comprising the step of increasing said received data to form an increased first aggregate data rate by accepting data from additional data sources.

17. The multiplexer according to claim 15 wherein said ceasing step includes releasing the use of said second communication channel upon all of said digital data being carried by said first communication channel.

18. A baud clock driven data multiplexer comprising:
means for receiving data from a plurality of DTE's, said data having an input aggregate data rate;
means for data multiplexing said received data together to form a first data stream, wherein said first data stream is a sum of data streams of the DTEs, carried by a first communication channel having a maximum data rate capacity;
means for automatically selecting a data rate for said first data stream from among a predetermined number of rates such that the selected data rate is the highest data rate of said predetermined rates that does not exceed said maximum data rate capacity of said first communication channel, and
quality-responsive diverting means for automatically diverting part of said received data to a second data stream carried by a second channel if said selected data rate becomes reduced in quality such that the first communication channel that carries the sum of the data streams of the DTE ports is unable to carry all of said first data stream.

19. The multiplexer according to claim 18 wherein said selecting means automatically selects a data rate less than said selected highest data rate upon said maximum data rate capacity of said first channel decreasing below said highest data rate.

20. A baud clock driven method for multiplexing data comprising the steps of:
receiving data from a plurality of DTEs, said data having an input aggregate data rate;
data multiplexing said received data together to form a first data stream wherein said first data stream is a sum of data streams of the DTEs and is carried by a first communication channel having a maximum data rate capacity;
automatically selecting a data rate for the highest data rate of a predetermined rate that does not exceed said maximum data rate capacity of said first communication channel, and
automatically diverting part of said received data to a second data stream carried by a second communication channel upon the first communication channel becoming reduced in quality such that said first communication channel is unable to carry all of the sum of the DTE data streams of said first data stream.

21. The method according to claim 20 further comprising the step of selecting a data rate less than said selected highest data rate upon said maximum data rate capacity of said first channel decreasing below said highest data rate.

22. The method according to claim 20 wherein part, but not all, of said received data is diverted to said second data stream with the remainder of said received data forming part of said first data stream carried by said first communication channel.

* * * * *

UNITED STATES PATENT AND TRADEMARK OFFICE
CERTIFICATE OF CORRECTION

PATENT NO. : 5,440,564
DATED : Aug. 8, 1995
INVENTOR(S) : Esther Ovadia
ARthur J. Barabell
Manickam R. Sridhar It is certified that error appears in the above-indentified patent and that said Letters Patent is hereby corrected as shown below:

On the title page, under item [19]:

"Ovada et al." should read --Ovadia et al.--

Signed and Sealed this

Seventeenth Day of October, 1995

Attest:

BRUCE LEHMAN

Attesting Officer        Commissioner of Patents and Trademarks